(12) United States Patent
Balankutty et al.

(10) Patent No.: US 8,594,603 B2
(45) Date of Patent: Nov. 26, 2013

(54) SYSTEMS AND METHODS FOR CANCELLING INTERFERERS IN A RECEIVER

(75) Inventors: Ajay Balankutty, New York, NY (US); Peter Kinget, Summit, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 12/941,777

(22) Filed: Nov. 8, 2010

(65) Prior Publication Data

US 2011/0124307 A1    May 26, 2011

Related U.S. Application Data

(60) Provisional application No. 61/259,183, filed on Nov. 8, 2009.

(51) Int. Cl.
*H04B 1/06* (2006.01)
*H04B 7/00* (2006.01)
*H04B 1/10* (2006.01)

(52) U.S. Cl.
USPC ......... 455/296; 455/278.1; 455/283; 455/303

(58) Field of Classification Search
USPC ............... 455/63.1, 296, 303–306, 313–317, 455/278.1, 283
See application file for complete search history.

(56) References Cited

U.S. PATENT DOCUMENTS

| | | | |
|---|---|---|---|
| 5,323,119 A | 6/1994 | Powell et al. | |
| 5,749,051 A | 5/1998 | Dent | |
| 5,778,310 A * | 7/1998 | Tong et al. | 455/306 |
| 6,075,980 A * | 6/2000 | Scheck | 455/324 |
| 6,088,581 A | 7/2000 | Bickley et al. | |
| 6,195,539 B1 * | 2/2001 | Galal et al. | 455/302 |
| 6,377,315 B1 | 4/2002 | Carr et al. | |
| 6,842,489 B2 | 1/2005 | Masenten | |
| 6,868,128 B1 | 3/2005 | Lane | |
| 6,941,121 B2 | 9/2005 | Chen | |
| 7,058,368 B2 | 6/2006 | Nicholls et al. | |
| 7,894,788 B2 * | 2/2011 | Keehr et al. | 455/296 |
| 8,055,234 B2 * | 11/2011 | Mattisson et al. | 455/296 |
| 2006/0045219 A1 * | 3/2006 | Wang et al. | 375/346 |
| 2009/0086864 A1 * | 4/2009 | Komninakis et al. | 375/346 |
| 2009/0186587 A1 | 7/2009 | Sobchak et al. | |
| 2010/0233984 A1 * | 9/2010 | Yang et al. | 455/307 |
| 2010/0233986 A1 * | 9/2010 | Yamaji et al. | 455/314 |
| 2011/0065409 A1 * | 3/2011 | Kenington | 455/307 |

OTHER PUBLICATIONS

Ayazian, S. and Gharpurey, R., "Feedforward Interference Cancellation in Radio Receiver Front-Ends", In IEEE Transactions in Circuits Systems II, vol. 54, No. 10, Oct. 2007, pp. 902-906.

Balankutty et al., "A 0.6V 32.5mW Highly Integrated Receiver for 2.4 GHz ISM-Band Applications", In 2008 IEEE International Solid-State Circuits Conference, 2008, pp. 366-367, and 620.

Balankutty, A., et al., "A 0.6-V Zero-IF/Low-IF Receiver with Integrated Fractional-N Synthesizer for 2.4-GHz ISM-Band Applications", In IEEE Journal of Solid-State Circuits, vol. 45, No. 3, Mar. 2010, pp. 538-553.

Brandolini, M., et al., "A 750mV Fully Integrated Direct Conversion Receiver Front-End for GSM in 90-nm CMOS", In IEEE Journal of Solid-State Circuits, vol. 42, No. 6, Jun. 2007, pp. 1310-1317.

(Continued)

*Primary Examiner* — Simon Nguyen

(74) *Attorney, Agent, or Firm* — Byrne Poh LLP

(57) ABSTRACT

In some embodiments, systems and methods for cancelling interferers in a receiver, comprise: a first mixer in a main path that downconverts a first RF signal to form a main baseband or intermediate-frequency signal; and a second mixer in an alternate path that downconverts a second RF signal to form an alternate baseband or intermediate-frequency signal, wherein the first RF signal and the second RF signal are both based on a third RF signal, and wherein the main baseband or intermediate-frequency signal and the alternate baseband or intermediate-frequency signal, when combined, cancel out an interferer in the third RF signal.

15 Claims, 8 Drawing Sheets

(56) References Cited

OTHER PUBLICATIONS

Chen, P.W., et al., "A 0.13 μm CMOS Quad-Band GSM/GPRS/EDGE RF Transceiver Using a Low-Noise Fractional-N Frequency Synthesizer and Direct-Conversion Architecture", In IEEE Journal of Solid-State Circuits, vol. 44, No. 5, May 2009, pp. 1454-1463.

Darabi, H., "A Blocker Filtering Technique for SAW-Less Wireless Receivers", In IEEE Journal of Solid-State Circuits, vol. 42, No. 12, Dec. 2007, pp. 2766-2773.

Gotz, E., et al., "A Quad-Band Low Power Single Chip Direct Conversion CMOS Transceiver with ΣΔ-Modulation Loop for GSM", In Proceedings of European Solid-State Circuits Conference (ESSCIRC), Sep. 2003, pp. 217-220.

Harada, M., et al., "2-GHz RF Front-End Circuits in CMOS/SIMOX Operating at an Extremely Low Voltage of 0.5V", In IEEE Journal of Solid-State Circuits, vol. 35, No. 12, Dec. 2000, pp. 2000-2004.

Ho, Y.C., et al., "A GSM/GPRS Receiver Front-End with Discrete-Time Filters in a 90nm Digital CMOS", In Proceedings of the 2005 IEEE Dallas/CAS Workshop in Architecture, Circuits and Implementation of SOCs (DCAS '05), Oct. 2005, pp. 199-202.

Hsu, C.M., "A Low-Noise, Wide-BW 3.6GHz Digital ΔΣ Fractional-N Frequency Synthesizer with a Noise-Shaping Time-to-Digital Converter and Quantization Noise Cancellation", In IEEE Journal of Solid-State Circuits, vol. 43, No. 12, Dec. 2008, pp. 2776-2786.

International Technology Roadmap for Semiconductors, "Process Integration, Devices, and Structures", 2007, available at: http://www.itrs.net/Links/2007ITRS/2007_Chapters/2007_PIDS.pdf.

Lee, S.T. and Peng, S., "A GSM Receiver Front-End in 65nm Digital CMOS Process", In Proceedings of IEEE Custom Integrated Circuits Conference (CICC), Sep. 2005, pp. 349-352.

Magoon, R., et al., "A Single-Chip Quad-Band (850/900/1800/1900 MHz) Direct Conversion GSM/GPRS RF Transceiver with Integrated VCOs and Fractional-N Synthesizer", In IEEE Journal Solid-State Circuits, vol. 37, No. 12, Dec. 2002, pp. 1710-1720.

Muhammad, K., et al., "The First Fully Integrated Quad-Band GSM/GPRS Receiver in a 90-nm Digital CMOS Process", In IEEE Journal of Solid-State Circuits, vol. 41, No. 8, Aug. 2006, pp. 1772-1783.

Orsatti, P., et al., "A 20mA-Receive 55mA-Transmit GSM Transceiver in 0.25 μm CMOS", In IEEE Journal of Solid- State Circuits, vol. 34, No. 12, Dec. 1999, pp. 1869-1880.

Ryynanen, J., et al., "A Dual-Band RF Front-End for WCDMA and GSM Applications", In IEEE Journal of Solid-State Circuits, vol. 36, No. 8, Aug. 2001, pp. 1198-1204.

Soer, M.C.M., et al., "A 0.2-to-2.0GHz 65nm CMOS Receiver Without LNA Achieving >11dBm IIP3 and < 6.5 dB NF", In IEEE International Solid-State Circuits Conference (ISSCC 2009), Digest of Technical Papers, 2009, pp. 222-223, 223a.

Stanic, N. et al., "A 0.5V 900 MHz CMOS Receiver Front End", In 2006 Symposium on VLSI Circuits, Digest of Technical Papers, 2006, pp. 228-229.

Stanic, N., et al., "A 0.5V Receiver in 90 nm CMOS for 2.4 GHz Applications", In IEEE Radio Frequency Integrated Circuits Symposium, 2007, pp. 109-112.

Stanic, N., et al., "A 2.4-GHz ISM-Band Sliding-IF Receiver With a 0.5-V Supply", In IEEE Journal of Solid-State Circuits, vol. 43, No. 5, May 2008, pp. 1138-1145.

Tadjpour, S., et al., "A 900MHz Dual Conversion Low-IF GSM Receiver in 0.35 μm CMOS", In IEEE International Solid-State Circuits Conference (ISSCC 2001), Digest of Technical Papers, vol. 455, 2001, pp. 292-293, 455.

Vidojkovic, V., et al., "A Low-Voltage Folded-Switching Mixer in 0.18 μm CMOS", In IEEE Journal of Solid-State Circuits, vol. 40, No. 6, Jun. 2005, pp. 1259-1264.

Wu, S. and Razavi, B., "A 900-MHz/1.8-GHz CMOS Receiver for Dual-Band Applications", In IEEE Journal of Solid-State Circuits, vol. 33, No. 12, Dec. 1998, pp. 2178-2185.

Abidi, A.A., "General Relations Between IP2, IP3, and Offsets in Differential Circuits and the Effects of Feedback", In IEEE Transactions on Microwave Theory and Techniques, vol. 51, No. 5, May 2003, pp. 1610-1612.

Ali-Ahmad, W.Y., "Effective IM2 Estimation for Two-Tone and WCDMA Modulated Blockers in Zero-IF", RF Design, Technical Report, Apr. 2004, p. 32-40.

Aparin, V., "A New Method of TX Leakage Cancelation in W/CDMA and GPS Receivers", In IEEE Proceedings of the Radio Frequency Integrated Circuits Symposium (RFIC '08), Digest of Technical Papers, Atlanta, GA, US, Jun. 15-17, 2008, pp. 87-90.

Bagheri, R., et al., "An 800 MHz to 5 GHz Software-Defined Radio Receiver in 90 nm CMOS",In IEEE International Solid-State Circuits Conference (ISSCC '06), Digest of Technical Papers, San Francisco, CA, US, Feb. 6-9, 2006, pp. 1932-1941.

Bautista, E.E., et al., "A High IIP2 Downconversion Mixer Using Dynamic Matching", In IEEE Journal of Solid-State Circuits, vol. 35, No. 12, Dec. 2000, pp. 1934-1941.

Blaakmeer, S.C., et al., "Wideband Balun-LNA with Simultaneous Output Balancing, Noise-Canceling and Distortion-Canceling", In IEEE Journal of Solid-State Circuits, vol. 43, No. 6, Jun. 2008, pp. 1341-1350.

Brandolini, M., et al., "A 750mV 15kHz 1/f Noise Corner 51dBm IIp2 Direct-Conversion Front-End for GSM in 90nm CMOS", In IEEE International Solid-State Circuits Conference (ISSCC '06), Digest of Technical Papers, San Francisco, CA, US, Feb. 6-9, 2006, pp. 470-471.

Chehrazi, S., et al., "A 6.5 GHz Wideband CMOS Low Noise Amplifier for Multi-Band Use", In Proceedings of the IEEE 2005 Custom Integrated Circuits Conference, San Jose, CA, US, Sep. 18-21, 2005, pp. 801-804.

Chehrazi, S., et al., "Noise in Passive FET Mixers: A Simple Physical Model", In Proceedings of the 2004 IEEE Custom Integrated Circuits Conference, San Jose, CA, US, Oct. 3-6, 2004, pp. 375-378.

Chen, M., et al., "Active 2nd-Order Intermodulation Calibration for Direct-Conversion Receivers", In IEEE International Solid-State Circuits Conference (ISSCC '06), Digest of Technical Papers, San Francisco, CA, US, Feb. 6-9, 2006, pp. 1830-1839.

Crols, J. and Steyaert, M.S.J., "A Single-Chip 900MHz CMOS Receiver Front-End With a High Performance Low-IF Topology", In IEEE Journal of Solid-State Circuits, vol. 30, No. 12, Dec. 1995, pp. 1483-1492.

Crols, J. and Steyaert, M.S.J., "Low-IF Topologies for High Performance Analog Front Ends of Fully Integrated Receivers", In IEEE Transactions on Circuits and Systems II: Analog and Digital Signal Processing, vol. 45, No. 3, Mar. 1998, pp. 269-282.

Darabi, H. and Abidi, A.A., "Noise in RF-CMOS Mixers: A Simple Physical Model", In IEEE Journal of Solid-State Circuits, vol. 35, No. 1, Jan. 2000, pp. 15-25.

Darabi, H. and Chiu, J., "A Noise Cancellation Technique in Active RF-CMOS Mixers", In IEEE Journal of Solid-State Circuits, vol. 40, No. 12, Dec. 2005, pp. 2628-2632.

Darabi, H., et al., "An IP2 Improvement Technique for Zero-If Down-Converters", In IEEE International Solid-State Circuits Conference (ISSCC '06), Digest of Technical Papers, San Francisco, CA, US, Feb. 6-9, 2006, pp. 1860-1869.

de Gyvez, J.P. and Tuinhout, H.P., "Threshold Voltage Mismatch and Intra-Die Leakage Current in Digital CMOS Circuits", In IEEE Journal of Solid-State Circuits, vol. 39, No. 1, Jan. 2004, pp. 157-168.

Dufrene, K., et al., "Digital Adaptive IIP2 Calibration Scheme for CMOS Downconversion Mixers", In IEEE Journal of Solid-State Circuits, vol. 43, No. 11, Nov. 2008, pp. 2434-2445.

Durene, K., "Analysis and Cancellation Methods of Second Order Intermodulation Distortion in RFIC Downconversion Mixers", Ph.D. Dissertation, University Erlangen-Nuremberg, Feb. 1999, pp. 1-187.

Elahi, I. and Muhammad, K., "IIP2 Calibration by Injecting DC Offset at the Mixer in a Wireless Receiver", In IEEE Transactions on Circuits and Systems II: Express Briefs, vol. 54, No. 12, Dec. 2007, pp. 1135-1139.

Elahi, I. and Muhammad, K., "On IIP2 Improvement by Injecting DC Offset at the Mixer in a Wireless Receiver", In Proceedings of the IEEE Custom Integrated Circuits Conference (CICC '07), San Jose, CA, US, Sep. 16-19, 2007, pp. 659-662.

Elahi, I., et al., "IIP2 and DC Offset in the Presence of Leakage at LO Frequency", In IEEE Transactions on Circuits and Systems II: Express Briefs, vol. 53, No. 8, Aug. 2006, pp. 647-651.

(56) References Cited

OTHER PUBLICATIONS

Feng, Y. et al., "Design of a high performance 2-GHz Direct-Conversion Front-End with a Single-Ended RF Input in 0.13 μm CMOS", In IEEE Journal Solid-State Circuits, vol. 44, No. 5, May 2009, pp. 1380-1390.

Feng, Y., et al., "A High Performance 2-GHz Direct-Conversion Front End with Single-Ended RF Input in 0.13 um CMOS", In Proceedings of the IEEE Radio Frequency Integrated Circuits Symposium (RFIC '08), Digest of Technical Papers, Atlanta, GA, US, Jun. 15-17, 2008, pp. 339-342.

Feng, Y., et al., "A Low-Power Low-Noise Direct-Conversion Front-End with Digitally Assisted IIP2 Background Self Calibration", In Proceedings of the IEEE International Solid-State Circuits Conference (ISSCC '10), Digest of Technical Papers, San Francisco, CA, US, Feb. 7-11, 2010, pp. 70-71.

Hashemi, H. and Hajimiri, A., "Concurrent Multiband Low-Noise Amplifiers-Theory, Design, and Application", In IEEE Transactions on Microwave Theory and Techniques, vol. 50, No. 1, Jan. 2002, pp. 288-301.

Hotti, M., et al., "A Direct Conversion RF Front-End for 2-GHz WCDMA and 5.8GHz WLAN Applications", In Proceedings of the 2003 IEEE Radio Frequency Integrated Circuits Symposium (RFIC '03), Digest of Technical Papers, Philadelphia, PA, US, Jun. 8-10, 2003, pp. 45-48.

Hotti, M., et al., "IIP2 Calibration Methods for Current Output Mixer in Direct-Conversion Receivers", In Proceedings of the IEEE International Symposium on Circuits and Systems (ISCAS '05), vol. 5, Kobe, JP, May 23-26, 2005, pp. 5059-5062.

Hotti, M., et al., "RC-Load Analysis of the Downconversion Mixer IIP2", In Proceedings of the 2005 European Conference on Circuit Theory and Design, vol. 2, Cork, IE, Aug. 28-Sep. 2, 2005, pp. 1/237-1/240.

Hwang, M.W., et al., "A High IIP2 Direct-Conversion Mixer Using an Even-Harmonic Reduction Technique for Cellular CDMA/PCS/GPS Applications", In Proceedings of the 2004 IEEE Radio Frequency Integrated Circuits (RFIC '08), Digest of Technical Papers, San Francisco, CA, US, Jun. 6-8, 2008, pp. 87-90.

Jensen, O.K., et al., "RF Receiver Requirements for 3G W-CDMA Mobile Equipment", In Microwave Journal, Feb. 1, 2000, pp. 22-46.

Kaczman, D., et al., "A Single-Chip 10-Band WCDMA/HSDPA 4-Band GSM/EDGE SAW-less CMOS Receiver With DigRF 3G Interface and +90 dBm IIP2", In IEEE Journal of Solid-State Circuits, vol. 44, No. 3, Mar. 2009, pp. 718-739.

Khatri, H., et al., "Distortion in Current Commutating Passive CMOS Downconversion Mixers", In IEEE Transactions on Microwave Theory and Techniques, vol. 57, No. 11, Nov. 2009, pp. 2671-2681.

Kim, N., et al., "A Highly Linear SAW-less CMOS Receiver Using a Mixer with Embedded TX Filtering for CDMA", In IEEE Journal of Solid-State Circuits, vol. 44, No. 8, Aug. 2009, pp. 2126-2137.

Kim, W., et al., "A Direct Conversion Receiver with an IP2 Calibrator for CDMA/PCS/GPS/AMPS Application", In IEEE Journal of Solid-State Circuits, vol. 41, No. 7, Jul. 2006, pp. 1535-1541.

Kivekas, K., et al., "Calibration Techniques of Active BiCMOS Mixers", In IEEE Journal of Solid-State Circuits, vol. 37, No. 6, Jun. 2002, pp. 766-769.

Laursen, S., "Second-Order Distortion in CMOS Direct Conversion Receiver for GSM", In Proceedings of the 25th European Solid-State Circuits Conference (ESSCIRC '99), Duisburg, DE, Sep. 21-23, 1999, pp. 342-345.

Leroux, P., et al., "A 0.8-dB NF ESD-Protected 9-mW CMOS LNA Operating at 1.23 GHz", In IEEE Journal of Solid-State Circuits, vol. 37, No. 6, Jun. 2002, pp. 760-765.

Liu, C.W. and Damgaard, M., "IP2 and IP3 Nonlinearity Specification for 3G/WCDMA Receivers", In Microwave Journal, May 12, 2009.

Long, J.R., "Monolithic Transformers for Silicon RF IC Design", In IEEE Journal of Solid-State Circuits, vol. 35, No. 9, Sep. 2000, pp. 1368-1382.

Manstretta, D., et al., "Second-Order Intermodulation Mechanisms in CMOS Downconverters", In IEEE Journal of Solid-State Circuits, vol. 38, No. 3, Mar. 2003, pp. 394-406.

Mikkelsen, J., et al., "Feasibility Study of DC Offset Filtering for UTRA-FDD/WCDMA Direct-Conversion Receiver", In Proceedings of the 17th IEEE NORCHIP Conference, Oslo, NO, Nov. 1999, pp. 34-39.

Mirabbasi, S. and Martin, K., "Classical and Modern Receiver Architectures", In IEEE Communications Magazine, vol. 38, No. 11, Nov. 2000, pp. 132-139.

Office Action dated Nov. 28, 2012 in U.S. Appl. No. 12/892,888.

Razavi, B., "A 2.4-GHz CMOS Receiver for IEEE 802.11 Wireless LAN's," IEEE Journal of Solid-State Circuits, vol. 34, No. 10, Oct. 1999, pp. 1382-1385.

Razavi, B., "Design Considerations for Direct-Conversion Receivers", In IEEE Transactions on Circuits and Systems II: Analog and Digital Signal Processing, vol. 44, No. 6, Jun. 1997, pp. 428-435.

Redman-White, W. and Leenaerts, D.M.W., "1/f Noise in Passive CMOS Mixers for Low and Zero IF Integrated Receivers", In Proceedings of the 27th European Solid-State Circuits Conference (ESSCIRC '01), Villach, AT, Sep. 18-20, 2001, pp. 41-44.

Rogin, J., et al., "A 1.5-V 45-mW Direct-Conversion WCDMA Receiver IC in 0.13-μm CMOS", In IEEE Journal of Solid-State Circuits, vol. 38, No. 12, Dec. 2003, pp. 2239-2248.

Rudell, J.C., et al., "A 1.9-GHz Wideband IF Double Conversion CMOS Receiver for Cordless Telephone Applications", In IEEE Journal of Solid-State Circuits, vol. 32, No. 12, Dec. 1997, pp. 2071-2088.

Sacchi, E., et al., "A 15mW, 70kHz 1/f Corner Direct Conversion CMOS Receiver", In Proceedings of the IEEE 2003 Custom Integrated Circuits Conference, San Jose, CA, US, Sep. 21-24, 2003, pp. 459-462.

Safarian, A., et al., "Integrated Blocker Filtering RF Front Ends", In Proceedings of the 2007 IEEE Radio Frequency Integrated Circuits (RFIC '07), Digest of Technical Papers, Honolulu, HI, US, Jun. 3-5, 2007, pp. 13-16.

Sivonen, P. and Parssinen, A., "Analysis and Optimization of Packaged Inductively Degenerated Common-Source Low-Noise Amplifiers with ESD Protection", In IEEE Transactions on Microwave Theory and Techniques, vol. 53, No. 4, Apr. 2005, pp. 1304-1313.

Springer, A., et al., "RF System Concepts for Highly Integrated RFICs for W-CDMA Mobile Radio Terminals", In IEEE Transactions on Microwave Theory and Techniques, vol. 50, No. 1, Jan. 2002, pp. 254-267.

Steyaert, M., et al., "A 2-V CMOS Cellular Transceiver Front-End", In IEEE Journal of Solid-State Circuits, vol. 35, No. 12, Dec. 2000, pp. 1895-1907.

Stroet, P.M., et al., "A Zero-IF Single-Chip Transceiver for Up to 22 Mb/s QPSK 802.11b Wireless LAN", In Proceedings of the 2001 IEEE International Solid-State Circuits Conference, Digest of Technical Papers, San Francisco, CA, US, Feb. 5-7, 2001, pp. 204-205, 447.

Terrovitis, M.T. and Meyer, R.G., "Intermodulation Distortion in Current-Commutating CMOS Mixers", In IEEE Journal of Solid-State Circuits, vol. 35, No. 10, Oct. 2000, pp. 1461-1473.

U.S. Appl. No. 12/892,888, filed Sep. 28, 2010.

U.S. Appl. No. 61/246,500, filed Sep. 28, 2009.

Valla, M., et al., "A 72-mW CMOS 802.11a Direct Conversion Front-End with 3.5-dB NF and 200-kHz 1/f Noise Corner", In IEEE Journal of Solid-State Circuits, vol. 40, No. 4, Apr. 2005, pp. 970-977.

Yamaji, T., et al., "An I/Q Active Balanced Harmonic Mixer with IM2 Cancelers and a 45/spl deg/ Phase Shifter", In IEEE Journal of Solid-State Circuits, vol. 33, No. 12, Dec. 1998, pp. 2240-2246.

Yanduru, N. K., et al., "A WCDMA, GSM/GPRS/EDGE Receiver Front End Without Interstage SAW Filter", In Proceedings of the 2006 IEEE Radio Frequency Integrated Circuits Symposium, Digest of Technical Papers, San Francisco, CA, US, Jun. 11-13, 2006, pp. 77-80.

Office Action dated Jun. 11, 2013 in U.S. Appl. No. 12/892,888.

* cited by examiner

SYSTEMS AND METHODS FOR CANCELLING INTERFERERS IN A RECEIVER

CROSS REFERENCE TO RELATED APPLICATION

This application claims the benefit of U.S. Provisional Patent Application No. 61/259,183, filed Nov. 8, 2009, which is hereby incorporated by reference herein in its entirety.

TECHNICAL FIELD

The disclosed subject matter relates to systems and methods for cancelling interferers in a receiver.

BACKGROUND

With recent technology scaling, the supply voltages on which circuits operate has continued to drop and supply voltages of 0.5-0.7 volts are foreseen for future highly scaled CMOS technologies. Like other areas of technology, wireless communication receivers (e.g., for mobile communications such as mobile telephones) will need to be capable of operating on such low supply voltages while maintaining low-noise-figure and high-linearity characteristics.

SUMMARY

Systems and methods for cancelling interferers in a receiver are provided. In some embodiments, systems for cancelling interferers in a receiver are provided, the systems comprising: a first mixer in a main path that downconverts a first RF signal to form a main baseband or intermediate-frequency signal; and a second mixer in an alternate path that downconverts a second RF signal to form an alternate baseband or intermediate-frequency signal, wherein the first RF signal and the second RF signal are both based on a third RF signal, and wherein the main baseband or intermediate-frequency signal and the alternate baseband or intermediate-frequency signal, when combined, cancel out an interferer in the third RF signal.

In some embodiments, methods for cancelling interferers in a receiver are provided, the methods comprising: downconverting a first RF signal to form a main baseband or intermediate-frequency signal; and downconverting a second RF signal to form an alternate baseband or intermediate-frequency signal, wherein the first RF signal and the second RF signal are both based on a third RF signal, and wherein the main baseband or intermediate-frequency signal and the alternate baseband or intermediate-frequency signal, when combined, cancel out an interferer in the third RF signal.

In some embodiments, methods for cancelling interferers in a receiver are provided, the methods comprising: a) providing a radio frequency test tone to a main path and an alternate path in a receiver; b) enabling the main path and disabling the alternate path and then measuring a downconverted signal amplitude produced at the output of the main path; c) enabling the alternate path and disabling the main path and then measuring a downconverted signal amplitude produced at the output of the alternate path; d) adjusting a gain setting in at least one of the main path and the alternate path to match the downconverted signal amplitude of the main path and the downconverted signal amplitude of the alternate path; e) enabling the main path and the alternate path and then measuring a signal power produced at a combined output of the main path and the alternate path; and f) adjusting a phase control setting in at least one of the main path and the alternate path to minimize the signal power produced at the combined output.

In some embodiments, systems for cancelling interferers in a receiver are provided, the systems comprising: at least one hardware processor that: a) provides a radio frequency test tone to a main path and an alternate path in a receiver; b) enables the main path and disables the alternate path and then measures a downconverted signal amplitude produced at the output of the main path; c) enables the alternate path and disables the main path and then measures a downconverted signal amplitude produced at the output of the alternate path; d) adjusts a gain setting in at least one of the main path and the alternate path to match the downconverted signal amplitude of the main path and the downconverted signal amplitude of the alternate path; e) enables the main path and the alternate path and then measures a signal power produced at a combined output of the main path and the alternate path; and f) adjusts a phase control setting in at least one of the main path and the alternate path to minimize the signal power produced at the combined output.

In some embodiments, computer-readable media containing computer-executable instructions that, when executed by a processor, cause the processor to perform a method for cancelling interferers in a receiver are provided, the method comprising: a) providing a radio frequency test tone to a main path and an alternate path in a receiver; b) enabling the main path and disabling the alternate path and then measuring a downconverted signal amplitude produced at the output of the main path; c) enabling the alternate path and disabling the main path and then measuring a downconverted signal amplitude produced at the output of the alternate path; d) adjusting a gain setting in at least one of the main path and the alternate path to match the downconverted signal amplitude of the main path and the downconverted signal amplitude of the alternate path; e) enabling the main path and the alternate path and then measuring a signal power produced at a combined output of the main path and the alternate path; and f) adjusting a phase control setting in at least one of the main path and the alternate path to minimize the signal power produced at the combined output.

DETAILED DESCRIPTION

In accordance with some embodiments, systems and methods for cancelling interferers in a receiver are provided. These mechanisms, in some embodiments, include a receiver architecture that uses two paths for processing a received RF signal. After the RF signal is received and amplifier by a low noise amplifier (LNA), the signal is coupled to a main path and alternate path with different noise and/or linearity characteristics. In the main path, the signal is then buffered and mixed with a local oscillator. In the alternate path, the signal is then buffered, mixed with a phase-shifted local oscillator, amplified by a programmable gain amplifier, and filtered by a high pass filter. The resultant signals from the main path and the alternate path are then combined. Because of the different noise and/or linearity characteristics, combining these resultant signals can cause interferers to be cancelled out when the gain and the phase of the two paths are matched. These mechanisms, in some embodiments, also include a process or scheme for matching the gain and the phase of the two paths.

Figure 1:
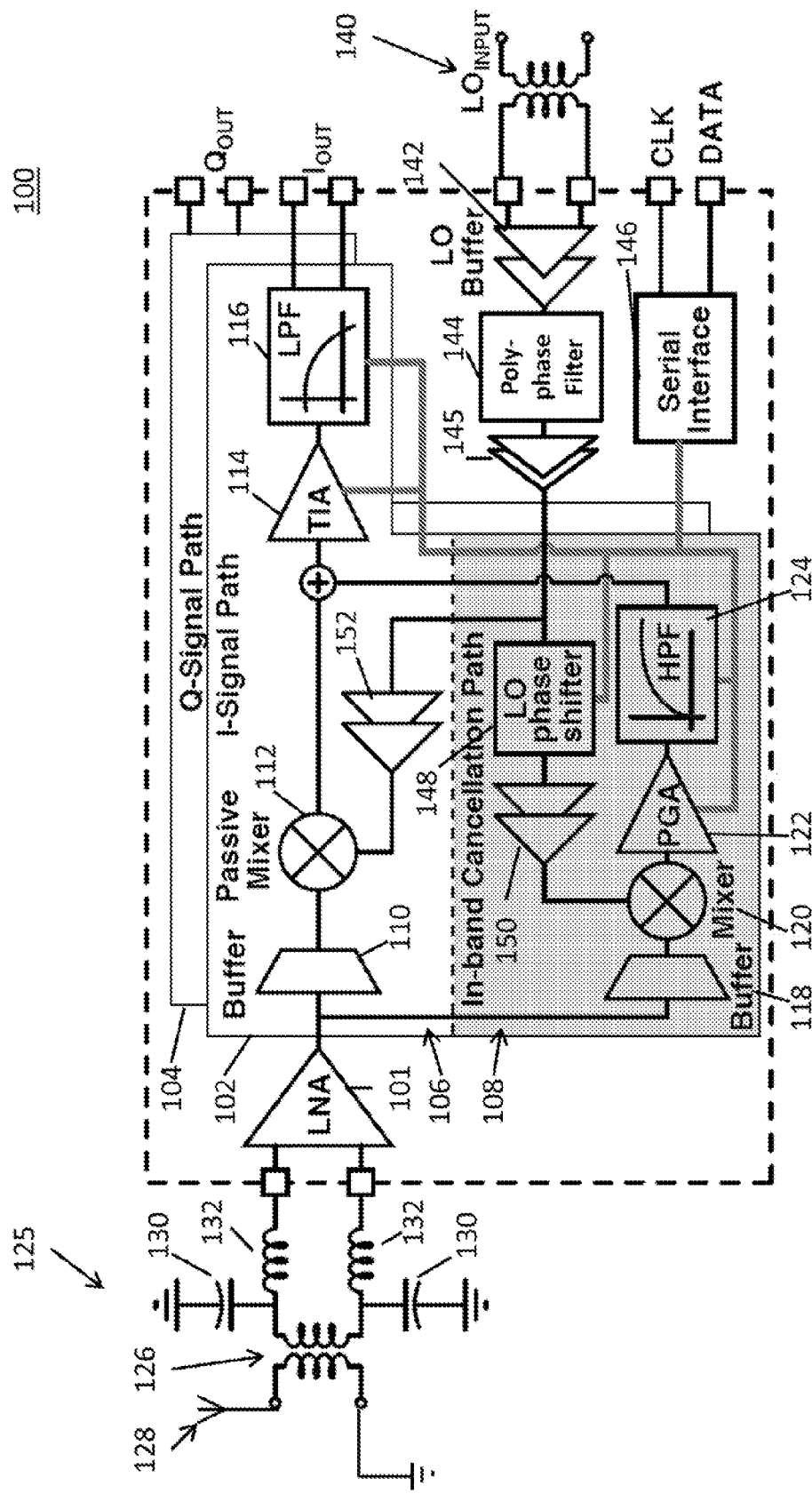
FIG. 1 is a diagram of an example receiver in accordance with some embodiments.

FIG. 1 shows an example block diagram of a direct conversion receiver 100 in accordance with some embodiments. In some embodiments, this receiver can operate off of a 0.6 V supply voltage. The receiver can include a radio frequency (RF) input section 125, a local oscillator (LO) input section 140, a LO buffer 142, a polyphase filter 144, a buffer 145, a serial interface 146, a low noise amplifier (LNA) 101 and two forward paths for each of an I-signal path 102 and a Q-signal path 104: a main signal path 106; and an alternate path 108 with different noise and/or linearity characteristics.

RF input section 125 can include an antenna 128, a balun 126, capacitors 130, and gate inductors $L_G$ 132. Balun 126 can be used to perform single-ended to differential conversion of an RF input signal from antenna 128 in some embodiments. Capacitors 130 and gate inductors $L_G$ 132 in combination with the transistors of LNA 101 can provide an impedance match to balun 126 and antenna 128 (e.g., which can have a 50Ω impedance). Gate inductors $L_G$ 132 can be realized in some embodiments using a combination of a high Q bond wire inductance with a discrete inductor.

Local oscillator input section 140 can include a balun for performing single-ended to differential conversion of a local oscillator input signal from any suitable local oscillator source (e.g., such as a 900 MHz local oscillator) in some embodiments. LO buffer 142 can be used to buffer the local oscillator signal. Polyphase filter 144 can be used to produce a quadrature LO signal. Serial interface 146 can be used to receive control signals in serial form and provide those signals in non-serial form to other components of the receiver, and can be implemented in any suitable manner.

LNA 101 can be any suitable low noise amplifier for amplifying an RF input signal and providing it to I-signal path 102 and Q-signal path 104 in some embodiments 4.

In each of I-signal path 102 and Q-signal path 104, the main signal path can include RF buffers 110, a passive mixer 112, a variable gain baseband transimpedance amplifier (TIA) 114, and a second order low pass filter 116 with a cutoff frequency of 100 kHz in some embodiments.

The performance of these blocks in the main signal paths can be as summarized in the following table in some embodiments:

| Block | Gain/ Transconductance/ Transimpedance | Noise Figure/ Integrated Output Noise | IIP3 |
|---|---|---|---|
| LNA | 22 dB | 3 dB | −3 dBm |
| Mixer | 1.26 mS | 1.52 $nV_{RMS}$ | 3 dBV |
| TIA | 10 kΩ | 38 $\mu V_{RMS}$ | −60 dBA |
| LPF | 14 dB | 50 $\mu V_{RMS}$ | 5 dBV |

In some embodiments, with these blocks alone, the receiver can achieve a cumulative gain of 58 dB, an overall dual side band noise figure (DSB NF) of 5.1 dB, but a third order input intercept point (IIP3) of only −29 dBm. The high gain required in the front-end to achieve a low noise figure can cause the IIP3 of the receiver main paths to be limited by the linearity of the baseband circuits TIA 114 and filter 116. This is because the third order intermodulation product (IM3) can be high enough to swamp the signal at the output of low pass filter 116.

To overcome the linearity bottleneck caused by these baseband circuits, out-of-channel interferers can be attenuated before reaching the baseband circuits in some embodiments. By applying a 20 dB rejection for in-band blockers before the baseband TIA via alternate signal paths 108, the IM3 products can be brought below the noise floor and the receiver performance can therefore not be limited by the non-linearity of the baseband circuits, and the overall IIP3 of the receiver can be −12 dBm.

Alternate signal paths 108 in each of I and Q signal paths 102 and 104 can include an RF buffer 118, a passive down-conversion mixer 120, a programmable gain amplifier (PGA) 122, and a high pass filter 124 in some embodiments. For out-of-channel signals, the baseband output of the alternate paths can be of equal magnitude, but opposite phase, to the baseband output of the main paths, resulting in signal cancellation before entering the TIA. High-pass filter 124 can help minimize the extent to which the in-channel signal is affected by the alternate path. This feed-forward interference cancellation can effectively place a notch in the receiver gain at the desired out-of-channel-blocker frequency.

Achieving accurate gain and phase relationships for the signals from the two paths can be difficult under process or environmental changes. Therefore calibration of these gain and phase relationships can be performed, e.g., as described below, in some embodiments. By controlling these gain and phase relationships for different offset frequencies, it may be possible to program the cancellation to work for a wide variety of out-of-channel signals.

Figure 2:
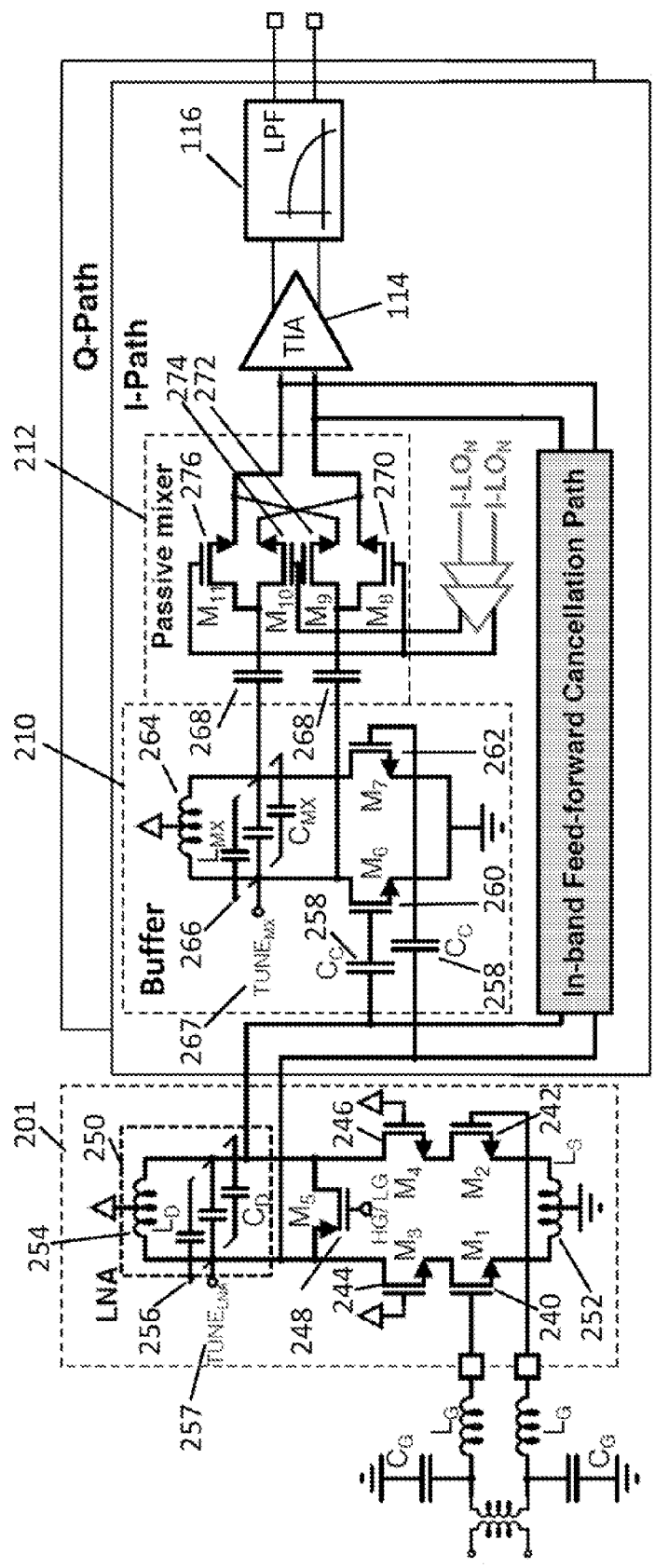
FIG. 2 is a diagram showing further details of an example low noise amplifier, and an example buffer and an example mixer of a main path, of an example receiver in accordance with some embodiments.

Turning to FIG. 2, further details of an LNA 201, a buffer 210, and a passive mixer 212 that can be used for LNA 101, buffer 110, and passive mixer 112 of FIG. 1, respectively, in some embodiments, are shown.

LNA 201 can be a pseudo-differential, inductively degenerated, cascoded common source amplifier with tuned load. A pseudo-differential LNA can be preferable over a fully differential LNA in some embodiments because it can have a stack of only two transistors (instead of three, for example) thus requiring a smaller saturation voltage (here about 250 mV, for example) and offering higher output swings. As shown, LNA 201 can include input transistors 240 and 242, cascode transistors 244 and 246, high/low gain switch 248, inductors $L_S$ 252, and tank 250 formed from inductor $L_D$ 254 and capacitors $C_D$ 256.

A forward body bias of 600 mV (or any other suitable value) can be applied to both input transistors 240 and 242 and cascode transistors 244 and 246 to reduce their $V_T$. The tuned output load provided by tank 250 and inductor 252 can allow for a single-ended swing of up to 700 mVpp (or any other suitable value) in some embodiments. This tuned load can be tuned by a $TUNE_{LNA}$ signal 257 that can be provided by serial interface 146 in some embodiments.

In simulation in some embodiments, the LNA can achieve a gain of 22 dB, a noise factor (NF) of 3 dB, and an IIP3 of −3 dBm, and consume 8 mA from a 0.6 V supply. The LNA can further have a low gain mode when switch $M_5$ 248 is turned ON; the switch then provides a low shunt impedance ($R_{ON} \approx 55\Omega$, for example) for tank 250, thus lowering the Q of the tuned load, and thereby reducing the LNA gain.

In some embodiments, in order to achieve high gain and low-voltage operation, voltage-to-current conversion and current commutation (driven by a local oscillator (LO)) in the signal paths can be kept separate. As shown in FIG. 1, this can be achieved in some embodiments by performing the voltage-to-current conversion in a transconductor with a tuned load in buffer 110 and the current commutation in a passive mixer 112. Separate transconductors can be used in some embodiments in the I and Q paths 102 and 104 to isolate the output of LNA 101 from the passive mixers 112 so that 50%-duty-cycle, quadrature LOs can be used without gain degradation of the LNA output.

As mentioned above, in some embodiments, buffer 110 and passive mixer 112 can be provided by buffer 210 and passive mixer 212 as shown in FIG. 2. As illustrated, buffer 210 can include coupling capacitors $C_C$ 258, input transistors $M_6$ 260 and $M_7$ 262, inductor $L_{MX}$ 264, and capacitors $C_{MX}$ 266 in some embodiments. Inductor $L_{MX}$ 264 and capacitors $C_{MX}$ 266 can provide a tuned load for buffer 212. This tuned load can be tuned using $TUNE_{MX}$ signal 267 that can be provided by serial interface 146 of FIG. 1 in some embodiments.

As also shown in FIG. 2, passive mixer 212 can include coupling capacitors 268, and switches $M_8$ 270, $M_9$ 272, $M_{10}$ 274, and $M_{11}$ 276. In some embodiment, passive mixer 212 can be configured to have a high LO swing in order to be more effective as a current commutator. The OFF/ON resistance ratio, $R_{OFF}/R_{ON}$, of switches 270, 272, 274, and 276 in the passive mixer can be used to determine the conversion gain degradation, L, of the passive mixer compared to an ideal mixer based on the following:

$$L = 20 * \log\left(\frac{\frac{R_{OFF}}{R_{ON}} - 1}{\frac{R_{OFF}}{R_{ON}} + 1}\right)$$

To keep the degradation, L, lower than 0.1 dB, an $R_{OFF}/R_{ON}$ ratio of at least 200 can be used in some embodiments. To reduce the ON resistance of switches 270, 272, 274, and 276 for the limited available LO swing at low voltages, nMOS switches can be used in some embodiments. The gates of these switches can be DC biased at 400 mV (or any other suitable voltage) and capacitively coupled to a 375 $mV_{pp,se}$ LO signal (or any other suitable LO signal). The source and drain of the switches can be DC biased at 100 mV (or any other suitable voltage), and a forward body bias of 600 mV (or any other suitable voltage) can be applied to reduce the $V_T$ and the $R_{ON}$ of the switches in some embodiments. In simulation, the nominal $R_{ON}$ can be 125Ω (or any other suitable value) and the $R_{OFF}$ can be 110 kΩ (or any other suitable value). As shown in FIG. 2, the downconverted signal current from passive mixer goes into the virtual ground of the baseband TIA 114. This can be used to avoid signal swing across switches 270, 272, 274, and 276, thus keeping passive mixer 212 very linear. In order to bias the source and drain of switches 270, 272, 274, and 276 of mixer 212 at 100 mV (or any other suitable value), the input common-mode of the TIA can be set to 100 mV (or any other suitable value).

Figure 3:
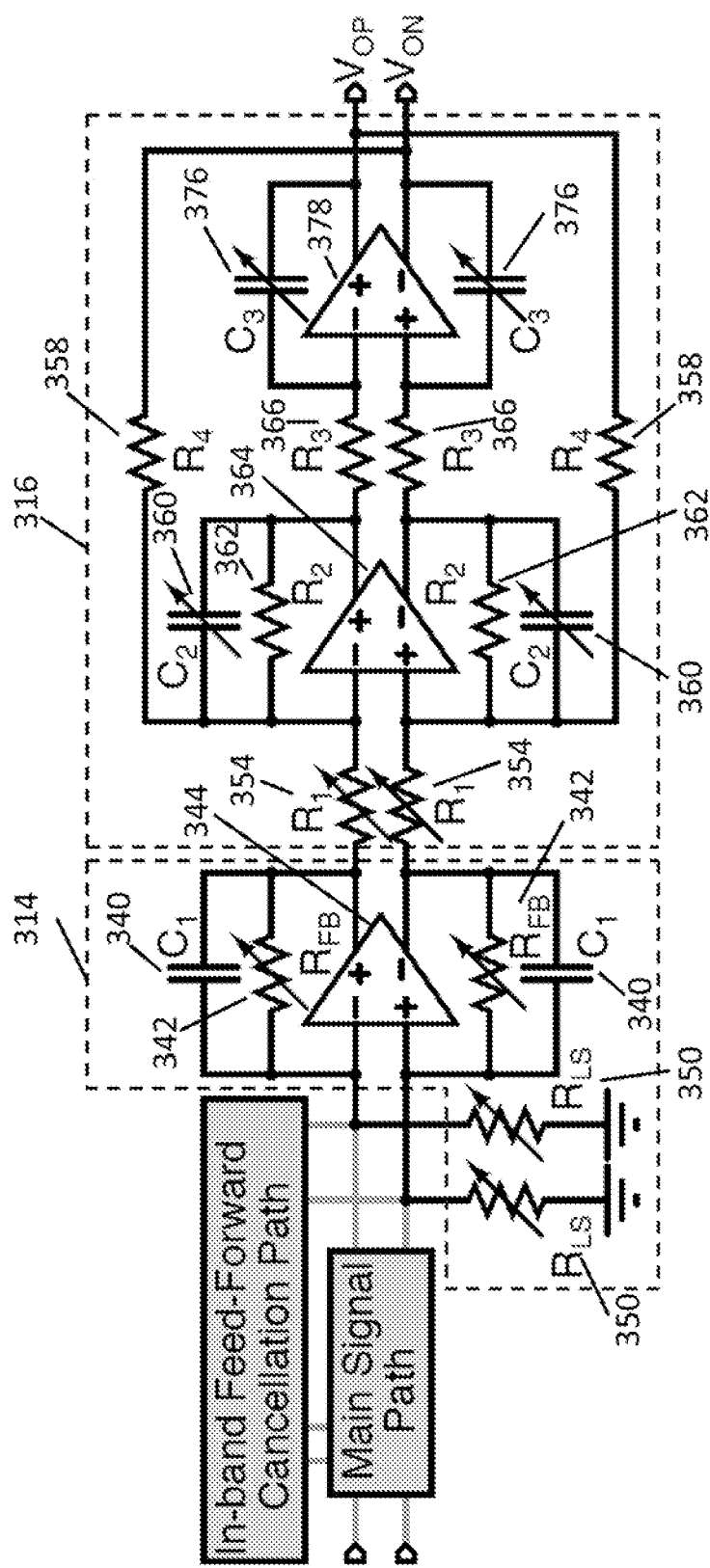
FIG. 3 is a diagram showing further details of an example baseband transimpedance amplifier and an example baseband filter of an example receiver in accordance with some embodiments.

Turning to FIG. 3, further details of a TIA 314 and a filter 316 that can be used for TIA 114 and filter 116 of FIG. 1, respectively, in some embodiments, are shown.

As illustrated, TIA 314 can include an operational transconductance amplifier 344, capacitors $C_1$ 340, feedback resistors $R_{FB}$ 342, and level-shifting resistors $R_{LS}$ 350.

In some embodiments, TIA 314 can have two gain settings controlled by feedback resistor $R_{FB}$ 342. In some embodiments, the output common-mode, $V_{O,CM}$, of TIA 314 can be set to 300 mV for maximal output swing, whereas the input common-mode, $V_{I,CM}$, of TIA 314 can be set to 100 mV for improved mixer switch biasing. Level-shifting resistors $R_{LS}$ 350 connected to ground can be used to control the input common-mode of TIA 314, and the value of $R_{LS}$ can be scaled in tandem with the gain setting of the TIA according to the following equation:

$$R_{LS} = R_{FB} V_{I,CM}/(V_{O,CM} - V_{I,CM}).$$

Channel-select filtration can be performed in both TIA 314 and filter 316 in some embodiments. To keep the noise contribution from channel-select filtration low, the TIA gain can be set to a high value of 80 dBΩ (or any other suitable value) in some embodiments. Using $C_1$ 340 and $R_{FB}$ 342, a first order filter can be implemented in the TIA with a cut-off frequency of 3 MHz to filter out far-out blockers in some embodiments.

A second order active-RC bi-quad filter with a 100 kHz low-pass Butterworth response can be implemented in filter 316 in some embodiments. As illustrated in FIG. 3, this filter can be formed from switched resistor banks $R_1$ 354, capacitors $C_2$ 360, resistors $R_2$ 362, operational transconductance amplifier 364, resistors $R_3$ 366, capacitors $C_3$ 376, and operational transconductance amplifier 378 in some embodiments. The second order filter can provide an attenuation of 30 dB at 600 kHz in some embodiments. A 14 dB variable gain can be implemented in the filter with switched resistor banks $R_1$ 354 at the input of the filter.

The values of resistors $R_{LS}$ 350, resistors $R_{FB}$ 342, resistors $R_1$ 354, capacitors $C_2$ 360, and capacitors $C_3$ 376 can be controlled by one or more signals from serial interface 146 of FIG. 1 in some embodiments.

Figure 4:
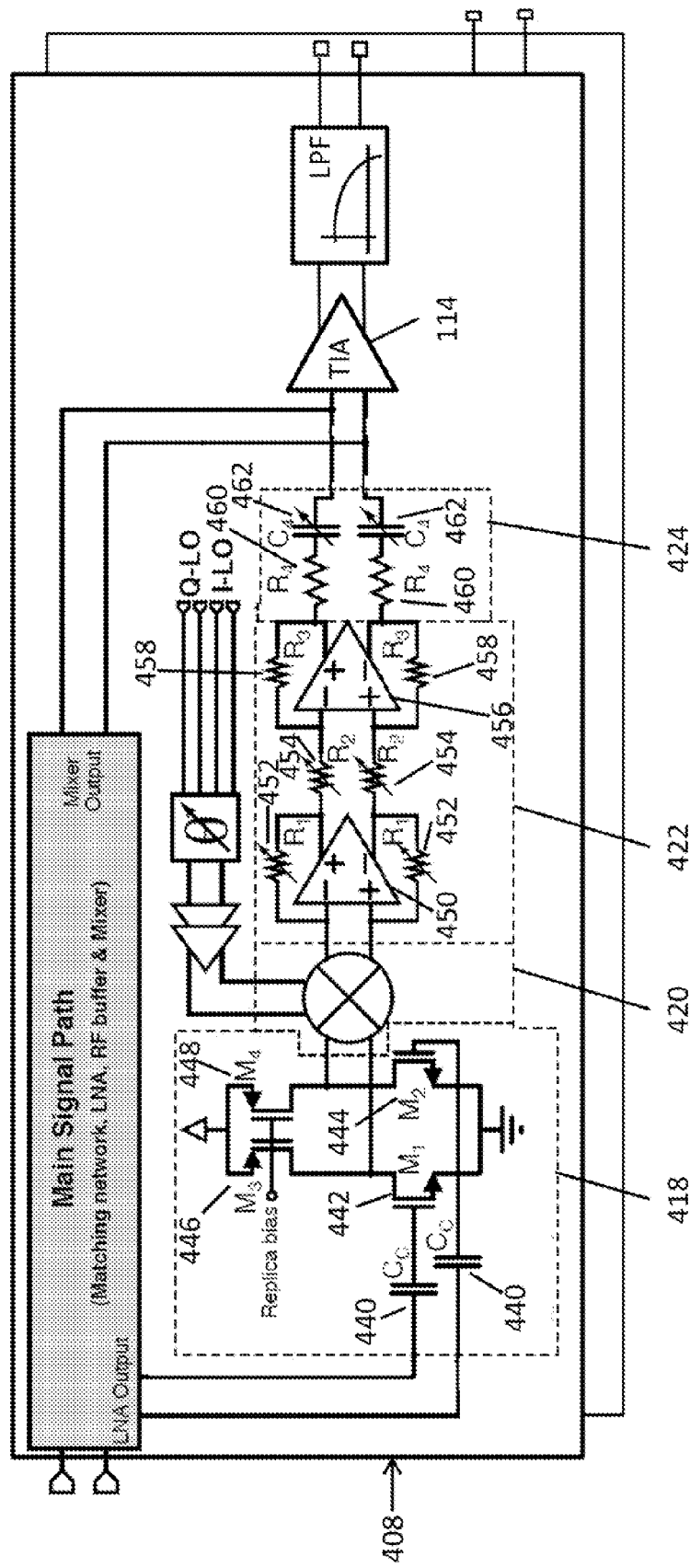
FIG. 4 is a diagram showing further details of an example buffer, an example programmable gain amplifier, and an example high pass filter of an alternate path of an example receiver in accordance with some embodiments.

Turning to FIG. 4, further details of a buffer 418, a mixer 420, a programmable gain amplifier 422, and a high pass filter 424 that can be used for buffer 118, mixer 120, programmable gain amplifier 122, and high pass filter 124 of alternate signal path 408 in accordance with some embodiments are shown.

As illustrated, buffer 418 can include coupling capacitors $C_C$ 440, signal transistors $M_1$ 442 and $M_2$ 444, and bias transistors $M_3$ 446 and $M_4$ 448 in some embodiments.

Mixer 420 can be a current-driven passive mixer (e.g., such as passive mixer 212 described herein in connection with FIG. 2) in some embodiments.

Programmable gain amplifier (PGA) 422 can include a transimpedance amplifier (TIA) 450, resistors $R_1$ 452 and $R_2$ 454, a feedback amplifier 456, and resistors $R_3$ 458. TIA 450 can have three gain settings (with relative values of 0 dB, 6 dB and 9 dB), which can be controlled by serial interface 146, in some embodiments. This TIA can provide low impedance at the output of the mixer. Fine gain control in the PGA can be realized using feedback amplifier 456 and discretely switched resistors $R_2$ 454. A combined gain range of 20 dB can be achieved in PGA 422 with a gain step of less than 1 dB using TIA 450 and feedback amplifier 456.

The high pass filter at the end of the alternate path can be used to block noise or intermodulation products from corrupting the in-channel path. High pass filter 424 can include a series combination of resistors $R_4$ 460 and capacitors $C_4$ 462, with values of 5 k ohms and 100 pF (or any other suitable values) in some embodiments. In some embodiments, capacitors 462 can be made tunable to adjust the cut-off frequency of the high pass filter from 200 kHz-450 kHz to account for process variations. A 10 dB attenuation up to 100 kHz can be achieved using high-pass filter 424 with a 3 dB cut-off frequency of 300 kHz in some embodiments. Filter 424 can pass the first in-band blocker at a 600 kHz offset from the desired channel with less than 1 dB of attenuation and can attenuate the desired channel in the alternate path by 10 dB in some embodiments.

The values of resistors R1 452, resistors R2 454, and capacitors 462 can be controlled by one or more signals from serial interface 146 in some embodiments.

Figure 5:
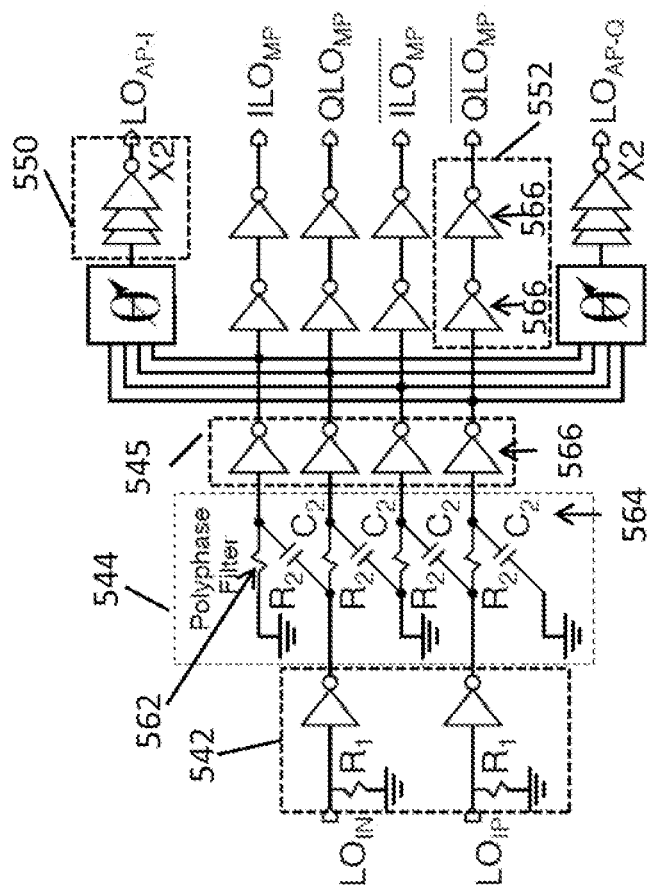
FIG. 5 is a diagram of an example local oscillator buffer, an example polyphase filter, and example buffers of an example receiver in accordance with some embodiments.

Turning back to FIG. 1, it can be seen that a local oscillator signal can be provided to each of the mixers in the main and alternate paths by LO buffer 142, polyphase filter 144, LO phase shifter 148, buffer 150, and buffer 152 in some embodiments. An example of a first order passive polyphase filter 544 that can be used as filter 144 to generate a quadrature 900 MHz LO from a differential LO signal in accordance with some embodiments is shown in FIG. 5. This filter can be formed from resistors $R_2$ 562 and capacitors $C_2$ 564, which can have values of 500 ohms and 350 fF (or any other suitable values), in some embodiments.

Figure 6:
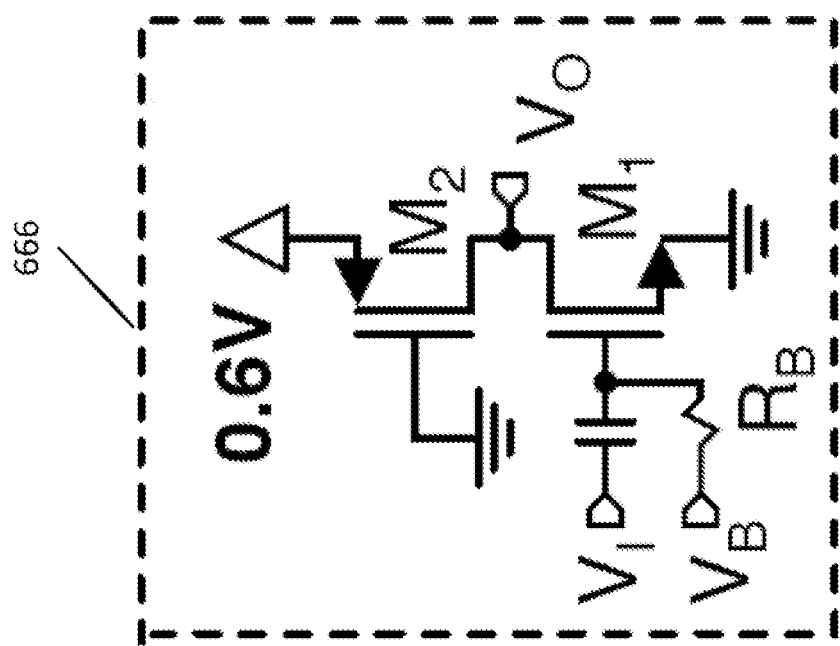
FIG. 6 is a diagram of an example amplifier of an example local oscillator buffer of an example receiver in accordance with some embodiments.
Figure 7:
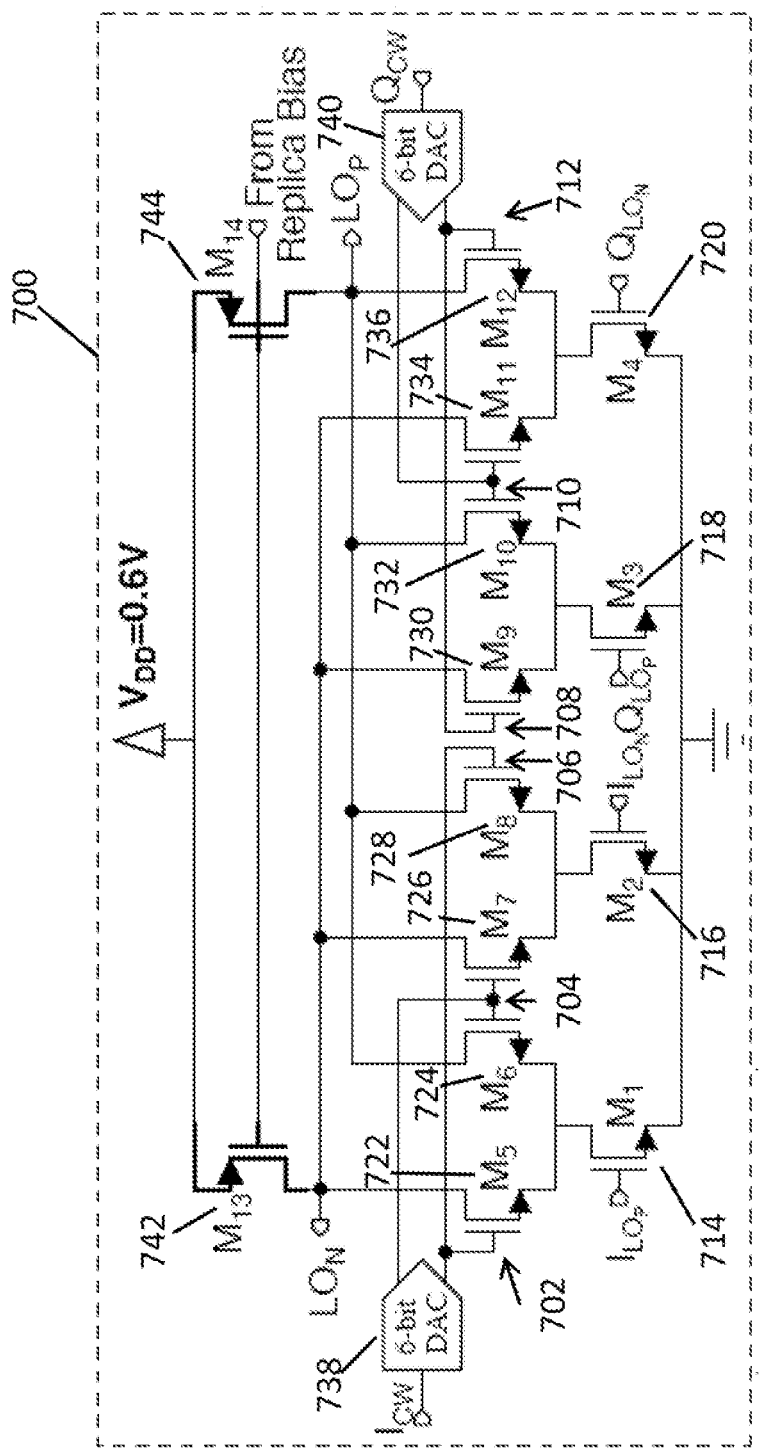
FIG. 7 is a diagram of an example phase shifter of an example receiver in accordance with some embodiments.

As also shown in FIG. 5, buffers 545, 550, and 552 (that can be used as buffers 145, 150, and 152, respectively, of FIG. 1 in some embodiments) can be used to amplify the quadrature LO from passive polyphase filter 544 in some embodiments. Buffers 545, 550, and 552 can be implemented in some embodiments as a cascade of amplifiers 566. An example common-source NMOS amplifier 666 with PMOS current source loads that can be used for amplifiers 566 in some embodiments is shown in FIG. 6. As illustrated, the LO can be capacitively coupled to amplifier 666 at $V_I$ and the amplifier can be DC biased using a replica circuit at $V_B$.

As described above, out of channel signals in the main signal path can be cancelled out by signals produced in the alternate signal path in accordance with some embodiments. In order to cancel the out-of-channel signal currents from the main and alternate signal paths at the input to TIA 114 in FIG. 1, the signals from these two paths need to have the same (or nearly the same) amplitude A but with opposite (or nearly opposite) phase. For an amplitude mismatch $\Delta A$ and a phase mismatch of $\Delta \phi$ between the main path and the alternate path out-of-channel signals, the maximum rejection (R) can be given by:

$$R \approx 10 \, \log(\Delta\phi^2 + (\Delta A/A)^2)$$

To get an out-of-channel signal rejection higher than 20 dB, the amplitude and phase mismatch between the two paths can be limited to 0.5 dB and 2.5 degrees, respectively, in some embodiments.

To match the amplitudes of the main path and alternate path, the gain of programmable gain amplifier (PGA) 122 can be controlled in some embodiments. In order to match the gains of the main path and alternate path to within 0.5 dB, a programmable gain with a step of 1 dB can be used.

To control the phase shift between the main and alternate paths, a phase shifter 700 can be used in accordance with some embodiments. The phase shifter can be implemented using a Cartesian combiner which takes the I and Q LO that can be generated using the passive polyphase filter (FIG. 5) and combines them with different weights. The different weights for each of the LO inputs can be controlled by changing the voltage of the cascode node (e.g., across 702 and 704, 704 and 706, 708 and 710, or 710 and 712) for each branch. For example, in the branch including transistors $M_1$ 714, $M_5$ 722, and $M_6$ 724, the current from $M_1$ 714 will split between $M_5$ 722 and $M_6$ 724 based on the impedance looking in to the sources of these transistors. To the first order, the current will split linearly depending on the cascode bias. The control voltages can be generated using two 6-bit current steering DACs 738 and 740 (based on one or more signals from serial interface 146 of FIG. 1) that change the cascode bias from 480 mV to 600 mV (or any other suitable values) in some embodiments. To get a phase shift of θ between one of the inputs (e.g., $I_{LO}$) and the output, the DAC voltage can be set such that:

$$\cos(\theta) = \frac{V_{I,DAC}}{\sqrt{V_{I,DAC}^2 + V_{Q,DAC}^2}}$$

$$\sin(\theta) = \frac{V_{Q,DAC}}{\sqrt{V_{I,DAC}^2 + V_{Q,DAC}^2}}$$

where:

$V_{I,DAC}$ is the output of the DAC generating the cascode voltage from $I_{CW}$; and $V_{Q,DAC}$ is the output of the DAC generating the cascode voltage from $Q_{CW}$.

The phase shifter output common mode can be set to 400 mV (or any other suitable value) in some embodiments. Because there is a stack of three transistors in each branch, the output swing can be limited to about 200 mVpp for a 0.6 V supply in some embodiments.

Because the phase noise performance of the alternate path may be more relaxed than that in the main path, the phase shifter can be implemented for the LO of the alternate path. The phase shifter can have a resolution better than 5 degrees over a 360 degree range in simulation in some embodiments.

Even assuming a worst-case amplitude mismatch of 0.5 dB from the PGA and a 2.5 degree phase mismatch from the phase shifter, a suppression of 22.6 dB can be achieved for the blockers in some embodiments.

Figure 8:
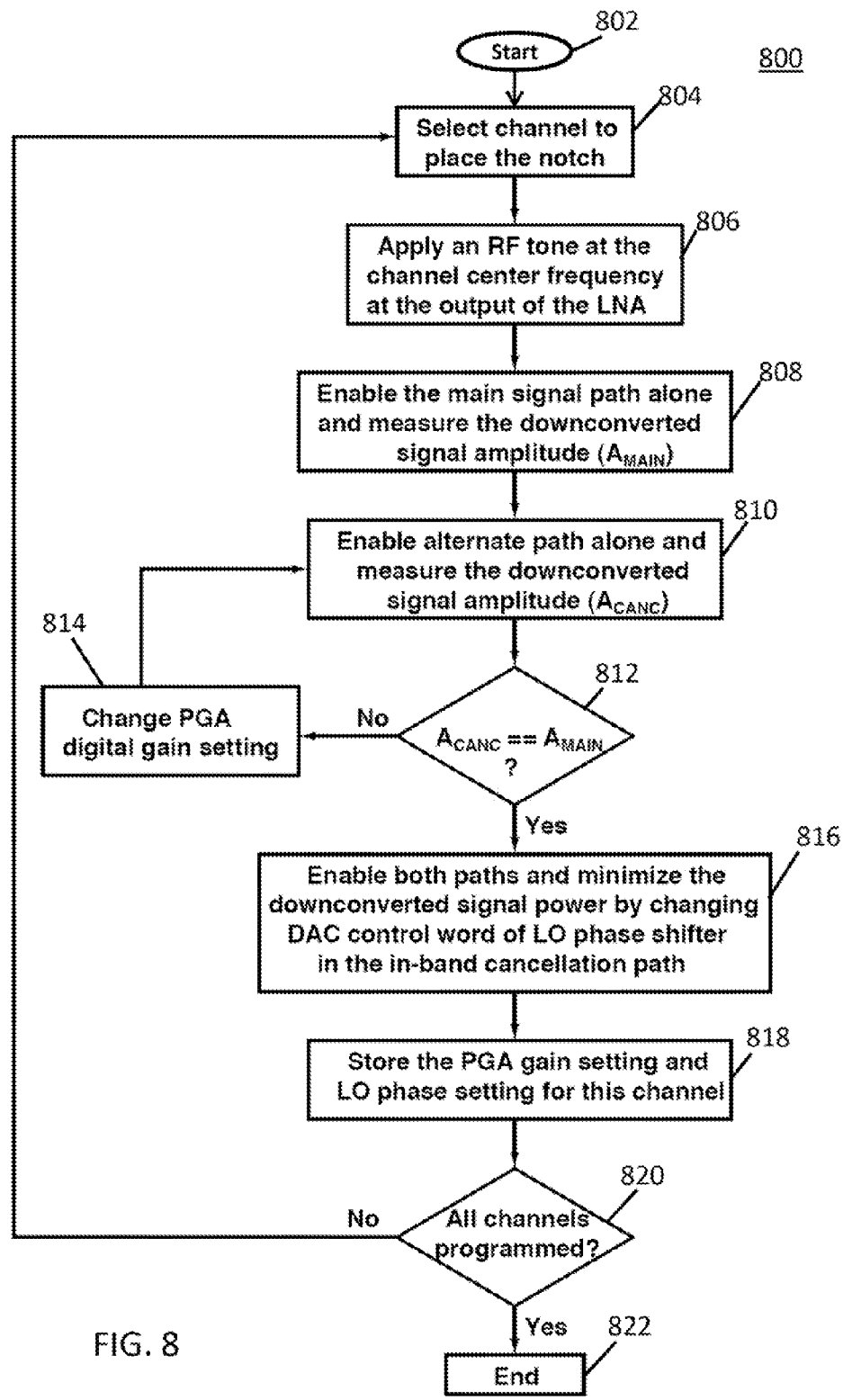
FIG. 8 is a diagram of an example calibration scheme for an example receiver in accordance with some embodiments.

A calibration scheme 800 that can be used to match (or nearly match) the amplitude and phase of the main and alternate paths in accordance with some embodiments is shown in FIG. 8. This scheme can be operated in one or more hardware processors (e.g., a microprocessor, a microcontroller, a programmable device, etc.) coupled to the receiver (e.g., via serial interface 146) in accordance with some embodiments.

As illustrated, after scheme 800 starts at 802, the scheme selects a channel in which a cancellation notch is desired at 804. Next, at 806, an RF test tone is applied to the receiver at the frequency where the notch is desired. This RF test tone can be provided by any suitable source. The main signal path is then enabled (and the alternate signal path is disabled) and the power of the test tone at the output of the main signal path is measured at 808. Next, the alternate signal path is then enabled (and the main signal path is disabled) and the power of the test tone at the output of the alternate signal path is measured at 810. In some embodiments, an analog to digital converter (ADC) with a resolution greater than 6-bits (e.g., a 12-bit ADC with a 2 Vpp input signal range) can be used to measure the power of the main and alternate signal paths, and the ADC sampling frequency can be set by the maximum offset frequency at which the cancellation notch is to be placed. It is then determined if the power levels at the outputs of the two paths are equal (or within a given tolerance). If not, then gain setting of the PGA is adjusted at 814 and scheme 800 loops back to 810. Otherwise, scheme 800 next enables both paths and sweeps the LO phase shift in the alternate path until the downconverted test tone power is minimized at the output of the receiver at 816. The LO phase shift that minimizes the test tone power is next stored at 818.

Scheme 800 next determines whether all channels have been programmed. If not, scheme 800 loops back to 804. Otherwise, scheme 800 terminates at 822.

After a receiver has been calibrated for one or more test tone frequencies, the calibration settings for each frequency can be stored and later used to configure the receiver when an interferer at a corresponding frequency is detected.

In some embodiments, any suitable computer readable media can be used for storing instructions for performing the functions, such as those described in connection with FIG. 8, described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for cancelling interferers in a receiver, comprising:
    a first mixer in a main path that downconverts a first RF signal to form a main baseband or intermediate-frequency signal;
    a second mixer in an alternate path that downconverts a second RF signal to form an alternate baseband or intermediate-frequency signal;
    a high-pass filter that filters the alternate baseband or intermediate-frequency signal to produce a high-pass-filtered alternate baseband or intermediate-frequency signal;
    a combiner that combines the main baseband or intermediate-frequency signal and the high-pass-filtered alternate baseband or intermediate-frequency signal to form a combined signal; and
    a low-pass filter that forms a baseband or intermediate-frequency signal based on the combined signal,
    wherein the first RF signal and the second RF signal are both based on a third RF signal, and wherein the main baseband or intermediate-frequency signal and the high-pass-filtered alternate baseband or intermediate-frequency signal, when combined, cancel out an interferer in the third RF signal.

2. The system of claim 1, wherein the first RF signal, the second RF signal, and the third RF signal are the same signal.

3. The system of claim 1, wherein the first mixer downconverts the first RF signal using a first local oscillator signal, the second mixer downconverts the second RF signal using a second local oscillator signal, and the first local oscillator signal and the second local oscillator signal are phase shifted with respect to each other.

4. The system of claim 3, wherein at least one of the first local oscillator signal and the second local oscillator signal are phase shifted with respect to each other by a phase shifter.

5. The system of claim 4, further comprising an interface for controlling phase shifter.

6. The system of claim 1, further comprising an amplifier in one of the main path and the alternate path for amplifying a corresponding one of the main baseband or intermediate-frequency signal and the alternate baseband or intermediate-frequency signal to match the other of the main baseband or intermediate-frequency signal and the alternate baseband or intermediate-frequency signal.

7. The system of claim 6, wherein the amplifier is a programmable gain amplifier.

8. The system of claim 6, further comprising an interface for controlling the gain of the amplifier.

9. A method for cancelling interferers in a receiver, comprising:
    downconverting a first RF signal to form a main baseband or intermediate-frequency signal;
    downconverting a second RF signal to form an alternate baseband or intermediate-frequency signal;
    high pass filtering the alternate baseband or intermediate-frequency signal to produce a high-pass-filtered alternate baseband or intermediate-frequency signal;
    combining the main baseband or intermediate-frequency signal and the high-pass-filtered alternate baseband or intermediate-frequency signal to form a combined signal; and
    forming a baseband or intermediate-frequency signal based on the combined signal using a low-pass filter,
    wherein the first RF signal and the second RF signal are both based on a third RF signal, and wherein the main baseband or intermediate-frequency signal and the high-pass-filtered alternate baseband or intermediate-frequency signal, when combined, cancel out an interferer in the third RF signal.

10. The method of claim 9, wherein the first RF signal, the second RF signal, and the third RF signal are the same signal.

11. The method of claim 9, wherein the downconverting of the first RF signal is performed using a first local oscillator signal, the downconverting of the second RF signal is performed using a second local oscillator signal, and the first local oscillator signal and the second local oscillator signal are phase shifted with respect to each other.

12. The method of claim 11, further comprising phase shifting at least one of the first local oscillator signal and the second local oscillator signal.

13. The method of claim 12, further comprising controlling the amount of the phase shifting.

14. The method of claim 9, further comprising amplifying one of the main baseband or intermediate-frequency signal and the alternate baseband or intermediate-frequency signal to match the other of the main baseband or intermediate-frequency signal and the alternate baseband or intermediate-frequency signal.

15. The method of claim 14, further comprising controlling the gain of the amplifying.

* * * * *